July 18, 1967 E. J. HAYES 3,331,473
DISC BRAKE WITH SELF-ENERGIZED BRAKE SHOE
Filed Feb. 28, 1966 2 Sheets-Sheet 2
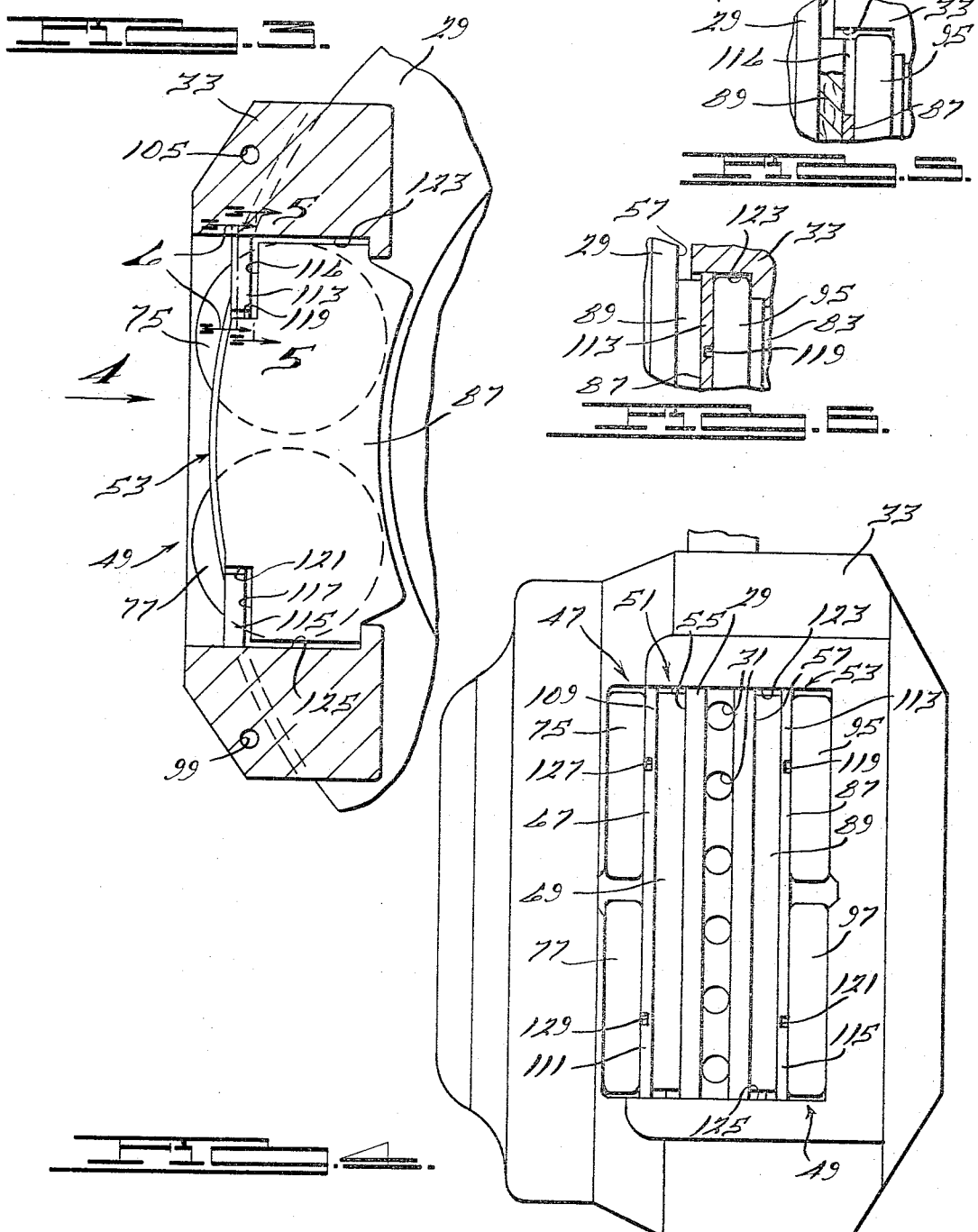
INVENTOR.
Edward J. Hayes
BY
Harness, Dickey & Pierce
ATTORNEYS.

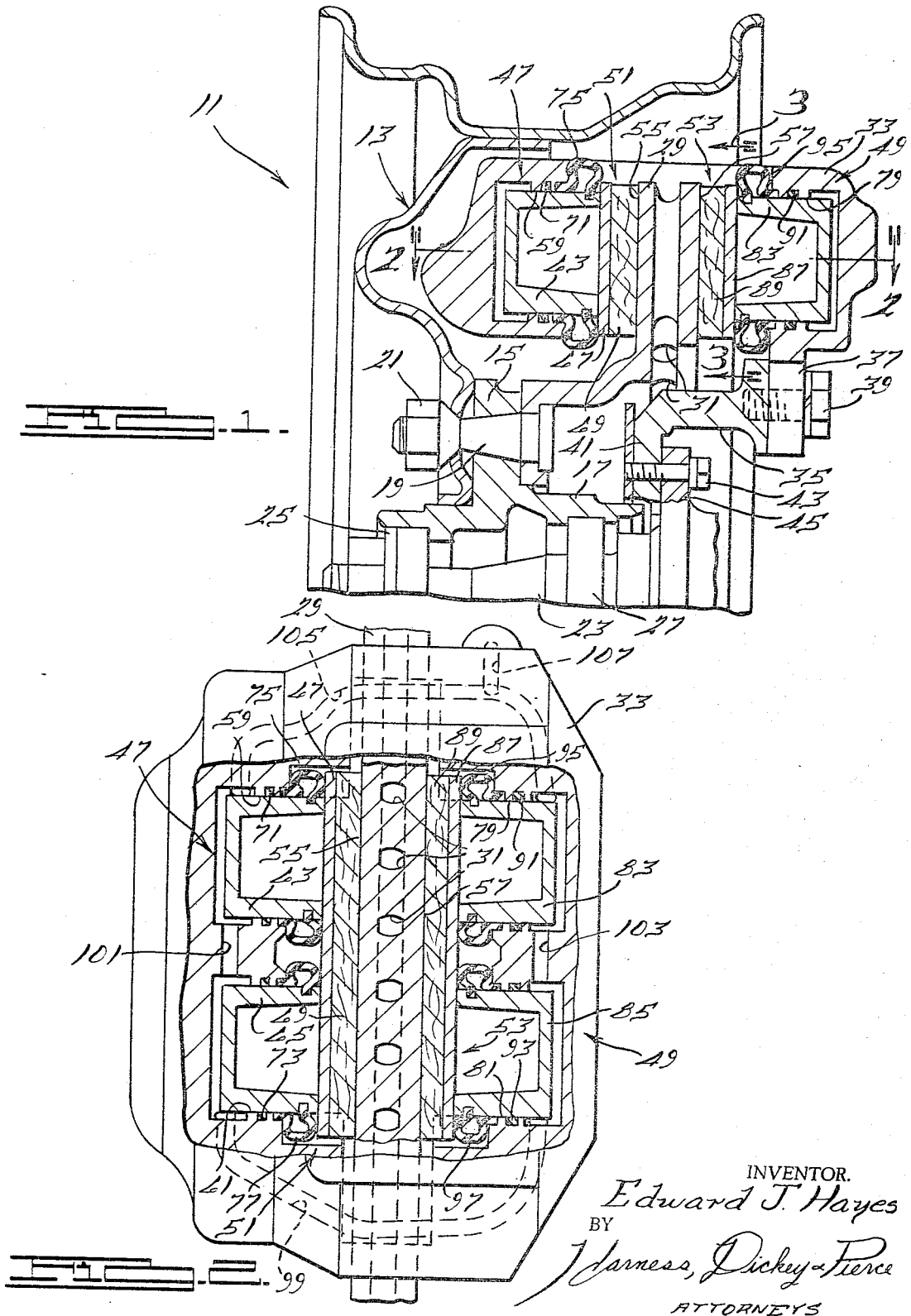

United States Patent Office 3,331,473
Patented July 18, 1967

3,331,473
DISC BRAKE WITH SELF-ENERGIZED
BRAKE SHOE
Edward J. Hayes, Livonia, Mich., assignor to Kelsey-Hayes Company, Romulus, Mich., a corporation of Delaware
Filed Feb. 28, 1966, Ser. No. 530,497
10 Claims. (Cl. 188—73)

This invention relates generally to brakes, and particularly to an improved disc brake having self-energized brake shoes.

Disc brakes embody a rotor or disc secured for rotation with a vehicle wheel. In the most common type of disc brake, a non-rotatable housing is supported with portions thereof overlying opposite faces of the rotor and has hydraulic motor means cooperable therewith serving to press brake shoes associated with the housing into frictional engagement with the rotor faces to slow or stop the vehicle.

The hydraulic motor means is energized conventionally by applying a brake pedal from within the vehicle which develops fluid pressure at a master cylinder hydraulically connected to the motor. The developed master cylinder pressure and, therefore, the pressure at the motor is proportional to the applied pedal pressure.

It is desirable to reduce the pedal pressure required to slow or stop the vehicle. In order to do this, it is necessary to increase the total braking effect or torque for a given pedal pressure, and a need exists for a relatively inexpensive disc brake construction adapted to achieve this result.

An important object of the present invention is to provide an improved disc brake having self-energizing brake shoes, that is, ones which serve to increase the total braking effect for a given pedal pressure.

Further objects include a disc brake of the above character which is relatively inexpensive to manufacture, durable in construction and reliable in operation.

Other objects and advantages of the present invention will become more apparent from a consideration of the following detailed description taken in conjunction with the drawings in which:

FIGURE 1 is a fragmentary sectional view illustrating a typical vehicle wheel assembly embodying the present invention;

FIG. 2 is a sectional view of FIG. 1 taken along the line 2—2 thereof;

FIG. 3 is a sectional view of FIG. 1 taken along the line 3—3 thereof;

FIG. 4 is an end view of FIG. 3 looking in the direction of the arrow 4;

FIG. 5 is a sectional view of FIG. 3 taken along the line 5—5 thereof; and

FIG. 6 is a sectional view of FIG. 3 taken along the line 6—6 thereof.

Broadly described, the present invention includes a disc brake having a brake shoe movable transversely to a surface of a rotor rotatable with a wheel to be braked, said shoe comprising a backing place having a brake lining secured thereto adapted to frictionally engage said rotor surface, a non-rotatable housing carrying said shoe, a leg hinged to said plate at one end thereof and operable to transmit braking torque from said plate to said housing in one direction of rotation of said rotor, said leg being pivotable with respect to said rotor during such torque transmission to permit slight circumferential movement of said lining and increase the contact pressure between said lining and said rotor.

Referring now more specifically to the drawings, a vehicle wheel embodying the present invention is shown generally at 11 in FIG. 1 and includes a wheel body 13 secured to a flange 15 of a hub 17 by bolts 19 and nuts 21. The hub 17 is rotatably supported upon a fixed wheel spindle 23 by bearings 25, 27 and has a rotor or disc 29 fixed thereto also by bolts 19 for conjoint rotation therewith. The disc 29 has a plurality of radially extending openings 31 therethrough with the web portions therebetween serving as fan blades which cause cooling air to flow through the openings 31 during turning movement of the rotor 29.

A generally rectangular, non-rotatable housing or yoke 33 is supported in surrounding relation to an arcuate segment of the rotor 29 by a rigid torque arm 35 fixed to one or more depending yoke flanges 37 by screws 39. The torque arm 35 has a laterally offset flange 41 fixed by screws 43 to a flange 45 integral with the fixed wheel spindle 23.

The yoke 33 is provided with opposed hydraulic motor means 47, 49 internally thereof and adapted to press opposed brake shoes 51, 33 into frictional engagement with opposite faces 55, 57, respectively, of the rotor 29. As seen perhaps best in FIG. 2, the motor means 47 includes a pair of generally parallel cylinder bores 59, 61 formed in the yoke 33 and having pistons 63, 65 slidably disposed therein, respectively, for movement in a direction transverse to the rotor 29. The brake shoe 51 generally includes a backing plate 67 slidably positioned within the yoke for movement in a direction transverse to the rotor 29 and having brake lining 69 bonded or riveted thereto in the usual manner.

The pistons 63, 65 are adapted for conjoint movement toward the rotor 29, or toward the right as seen in FIG. 2 where they engage the backing plate 67 and press the brake lining 69 into frictional contact with the face 55 of rotor 29. Generally rectangular cross-sectional seals 71, 73 are carried within the bores 59, 61 to sealingly engage the pistons 63, 65, respectively. These seals become twisted or distorted when the pistons 63, 65 move toward the right as seen in the figure so that upon release of the motivating force thereon, the seals 71, 73 return the pistons 63, 65 toward the left and release the brake lining 69 from the rotor face 55. A pair of flexible boots 75, 77 have their ends secured to the yoke 33 and the pistons 63, 65, respectively, and prevent dirt, grease or other foreign matter from contaminating the sliding surfaces of the bores 59, 61 and pistons 63, 65.

Similarly, the motor means 49 comprises a generally parallel pair of cylinder bores 79, 81 formed in the yoke 33 and having pistons 83, 85 slidably disposed therein for movement transversely to the rotor 29 and generally opposed to the pistons 63, 65. The pistons 83, 85 are positioned to engage a backing plate 87 having brake lining 89 bonded or riveted thereto. The backing plate 87 is slidably disposed within the yoke 33 for movement transversely of the rotor 29 so that when the pistons 83, 85 are moved toward the left, as seen in FIG. 2, they press the brake lining 89 into frictional engagement with the rotor face 57. A pair of generally rectangular cross-sectional seals 91, 93 are also carried within the bores 79, 81 and engage the pistons 83, 85 to seal the sliding joints and to return the pistons 83, 85 toward the right when the motivating force therefor is released. A pair of flexible boots 95, 97 have their ends secured to the yoke 33 and the pistons 83, 85 to prevent dirt, grease and other foreign matter from contaminating the sliding surfaces of the pistons 83, 85 and cylinder bores 79, 81.

To motivate the pistons 63, 65 and 83, 85, pressurized fluid is admitted to the cylinder bores 59, 61 and 79, 81 behind the seals 71, 73 and 91, 93, respectively, through an inlet passage 99 formed in the yoke 33 and which opens into the cylinder bores 61, 81. The cylinder bores 59, 79 are communicated with the bores 61, 81 by passages 101, 103, respectively. Pressurized fluid is delivered to the inlet passage 99, for example, from a conventional master cylinder (not shown) energized by the usual brake pedal located within the vehicle as is customary. Thus, when the brake pedal is applied, it energizes the master cylinder (not shown) to deliver pressurized to the motor means 47, 49. The pistons 63, 65 and 83, 85 are all substantially equal in cross-sectional area so that the brake shoes 51, 53 are applied to the rotor 29 with equal pressure. A bleed passage 105 opens into the cylinder bores 59, 79 above the inlet passage 99 and is connected to normally closed bleed line 107 for bleeding the motor means 47, 49.

When the brake shoes 51, 53 are pressed into frictional engagement with the turning rotor 29, torque is generated on the shoes 51, 53 tending to turn them in the same direction as the rotor 29. According to the present invention, this torque, which is reacted at the yoke 33 and the torque arms 35, is utilized to increase the total braking effect at the rotor 29 for a given pedal pressure, thereby making the brake shoes 51, 53 self-energizing.

As seen in FIGS. 3-6, the backing plates 67, 87 have at least one and preferably a pair of hinged legs 109, 111 and 113, 115, respectively, at their outer, upper ends. The legs 113, 115 of the backing plate 87 are formed by longitudinal slots 116, 117 extending inwardly of the outer ends of the backing plate 87 and by transverse notches 119, 121 extending from the end of the backing plate 87 to the ends of the slots 115, 117, respectively. The legs 113, 115 extend outwardly slightly beyond the ends of the backing plate 87, as seen best in FIG. 3, and snugly but slidably engage flat surfaces 123, 125 formed on the yoke interior while the ends of the plate 87 itself are spaced therefrom.

In use, when the rotor 29 is turning in a clockwise direction, as seen in FIG. 3, and the brake shoe 53 is applied, frictional contact between the lining 89 and the rotor surface 57 exerts torque on the shoe 53 causing the leg 113 to press tightly against the yoke surface 123. The location of the notch 119 together with pressure on the brake shoe 53 from the motor means 49 and friction between the surface 123 and the leg 113 causes this leg to pivot or bend slightly away from the rotor 29 about an axis adjacent and behind the notch 119 or in a clockwise direction as seen in FIG. 6. Since the leg 113 is in tight frictional engagement with the yoke surface 123, this bending or hinge movement serves to move the brake lining 89 of the shoe 53 more tightly in engagement with the rotor surface 57 thereby increasing the total braking effect realized. Also, the greater the turning speed of the rotor 29 and/or the pedal pressure applying the shoe 53 during braking, the greater will be the bending or hinging of the leg 113 and the increased braking effect realized at the shoe 53.

If the rotor 29 is turning in a counterclockwise direction, as seen in FIG. 3, when the brakes are applied, the result will be that the leg 115 is pressed into tighter engagement with the yoke surface 125 causing it to bend or hinge about an axis adjacent and behind the notch 121 thereby increasing the total braking effect of the brake shoe 53.

The hinged legs 109, 111 are formed similarly to the legs 113, 115 having transverse notches 127, 129 similar to the notches 119, 121 and longitudinal slots (not shown) similar to the slots 116, 117. Thus, when the brake shoe 51 is applied, the same effect is realized in that either the leg 109 or the leg 111 bends or hinges about an axis adjacent and behind the notch 127 or 129, depending on the direction of rotor turning movement at the time, in a manner so as to increase the total braking effect realized at the brake shoe 51. Thus, the total braking effect of the shoes 51, 53 on the rotor 29 and the wheel 13 associated therewith is increased for a given pedal pressure.

By the foregoing, there has been disclosed an improved disc brake having simple and relatively inexpensive self-energized brake shoes, and while a preferred embodiment of the invention has been illustrated and described above in detail, various additions, substitutions, modifications and omissions may be made thereto without departing from the spirit of the invention as encompassed by the appended claims.

What is claimed is:

1. A disc brake including a brake shoe movable transversely to a surface of a rotor rotatable with a wheel to be braked, said shoe comprising a backing plate having a brake lining secured thereto adapted to frictionally engage said rotor surface, a non-rotatable housing carrying said shoe, a leg hinged to said plate at one end thereof and operable to transmit braking torque from said plate to said housing in one direction of rotation of said rotor, said leg being pivotable with respect to said rotor during such torque transmission to permit slight circumferential movement of said lining and increase the contact pressure between said lining and said rotor.

2. A disc brake as defined in claim 1 wherein said plate has a leg hinged at each end thereof and operable to transmit braking torque from said plate to said housing in both directions of rotation of said rotor to increase the contact pressure between said lining and said rotor.

3. A disc brake as defined in claim 1 wherein said hinged leg is formed by an intersecting longitudinal slot and transverse notch in said plate.

4. A disc brake as defined in claim 1 wherein said leg engages said housing and the end of said plate adjacent said leg is spaced from said housing.

5. A disc brake as defined in claim 3 wherein said slot and notch are adjacent one corner of said plate.

6. A disc brake as defined in claim 1 wherein said leg pivots about an axis parallel to a plane defined by said circumferential movement of said lining and perpendicular to the direction of pressure applying movement of said shoe.

7. A disc brake as defined in claim 3 wherein said leg bends about an axis adjacent and behind said notch which axis is parallel to a plane defined by said circumferential movement of said lining and perpendicular to the direction of pressure applying movement of said shoe.

8. A disc brake as defined in claim 1 including another brake shoe movable transversely to the opposite surface of said rotor and carried by said housing, said last-mentioned brake shoe comprising a backing plate having at least one hinged leg at one end thereof operable to transmit braking torque from said last-mentioned plate to said housing in said one direction of rotation of said rotor, a brake lining secured to said last-mentioned plate adapted to frictionally engage said opposite rotor surface, said last-mentioned leg being pivotable with respect to said rotor during such torque transmission to permit slight circumferential movement of said last-mentioned lining and increase the contact pressure between said last-mentioned lining and said rotor.

9. A disc brake as defined in claim 1 included fluid motor means associated with said housing for moving said brake shoe transversely to said rotor surface.

10. A disc brake as defined in claim 3 wherein said notch is formed in one face of said plate adjacent said brake lining.

References Cited

UNITED STATES PATENTS 3,207,267 9/1965 Beuchle et al. ------- 188—73
3,236,335 2/1966 Dowell ------------- 188—73

MILTON BUCHLER, *Primary Examiner.*

G. E. HALVOSA, *Assistant Examiner.*